United States Patent [19]
Hirshberg

[11] Patent Number: 5,289,369
[45] Date of Patent: Feb. 22, 1994

[54] CAR RENT SYSTEM

[76] Inventor: Israel Hirshberg, Petach Tikva, Israel

[21] Appl. No.: 661,222

[22] Filed: Feb. 27, 1991

[30] Foreign Application Priority Data

Feb. 27, 1990 [IL] Israel .................................... 93567

[51] Int. Cl.⁵ .............................................. G06F 15/21
[52] U.S. Cl. ..................................... 364/401; 364/407;
235/382.5; 340/992; 340/993; 340/825.31; 340/825.34
[58] Field of Search ............... 364/401, 403, 402, 407, 364/408; 340/991–994, 825.31, 825.33, 825.34, 825.36; 342/450; 235/382, 384

[56] References Cited

U.S. PATENT DOCUMENTS

| | | | |
|---|---|---|---|
| 3,624,608 | 11/1971 | Altman et al. | 340/825.33 |
| 3,665,397 | 5/1972 | Di Napoli et al. | 340/825.33 |
| 4,177,466 | 12/1979 | Reagan | 342/456 |
| 4,398,172 | 8/1983 | Carroll et al. | 340/825.54 |
| 4,728,922 | 3/1988 | Christen et al. | 340/991 |
| 5,032,845 | 7/1991 | Velasco | 342/457 |
| 5,066,853 | 11/1991 | Brisson | 235/381 |
| 5,124,920 | 6/1992 | Tamada et al. | 235/382.5 |

Primary Examiner—Roy N. Envall, Jr.
Assistant Examiner—Jennifer L. Hazard
Attorney, Agent, or Firm—Keck, Mahin & Cate

[57] ABSTRACT

A highly automated car-rental system based on a specially equipped fleet of cars for hire and one or more control stations. An authorized subscriber can enter any car of the fleet which is free for hire at any location, and use it for a desired period of time, parking it at the end of the hire period at any authorized parking place. Cars are equipped with customer, identification means, means enabling use of tile car or refusing such use, monitoring means for the main subsystems and other parameters of the car and means for conveying such information to central control. There is also provided a system for monitoring in real time car position, and if desired, for displaying such information also on a monitor in the car, thus informing control on tile position of the car at any instant of time.

10 Claims, 5 Drawing Sheets

CAR RENT SYSTEM

FIELD OF THE INVENTION

A car-rental system based on a fleet of specially equipped cars, which can be picked up and used by a subscriber of the system at either of a number of central parking lots, or at any random location ere another user has parked a car at the termination of its hire. A control system keeps track of the location and movement of each car and the status of its main subsystems, It also checks the identity and whether a certain person attempting to hire a car is entitled to do so, enabling an entitled person to enter the car and use it for any desired period of time. It monitors the movements of the car and at tile end of the hire period computes the bill of the subscriber. Servicing is done by personnel of the company. Other and further features will become apparent hereinafter.

BACKGROUND OF THE INVENTION

There exist many companies engaged in the hire of cars, This is generally done at certain terminals where the customer rents and picks up a car, and after use this car must be returned to a certain address, either the one where it was hired, or another one of the same company. Car hire is generally for a period of a number of days, and the customer has to fulfil certain formalities and sign forms.

One of the drawbacks is the fixed location start and fixed location return of the rented car. Another is the big problem of parking due to the congestion of traffic in most cities, and this reduces the attractivity of renting a car for use inside large cities. The novel system, which is highly automated, obviates to a large extent drawbacks of existing car hire procedures, and it is one of the main features that the person renting a car can leave it at any free parking space within the confines of a certain predetermined territory.

SUMMARY OF THE INVENTION

The invention relates to a highly automated car rental system, It comprises a fleet of cars, mainly private cars, each comprising special equipment as will be set out in the following, the main features being means for the identification of a person attempting to hire the car, means for establishing whether such person is entitled to do so, means for permitting entry of a person so entitled and also enabling him to use the car;

subscriber identification means issued to each subscriber, containing all the data required by the car-rental company, such as identity etc; where it is possible to store relevant data at a control-command station; such means permitting a subscriber access to a car of the car fleet free for rental is generally in the form of a magnetic or clever electronic card;

each of the cars will be designated as belonging to the car-rental company, and will have means indicating to the potential user whether the car is free for hire or not.

There is provided a system passing on information to central control where each car is located at any given period of time.

There is further provided either one central control or a central control with a number of substations, which automatically carries out most of the functions required for the smooth operation of the entire system.

There is further provided service personnel with special equipment for any required servicing or repairs, and for the refueling of the cars, The determination of the location of the individual cars can be carried out by any of the known existing location systems, It can be effected by means of a plurality of sensing means located along main roads and equipped with transceiving means, sensing when a car passes such a control post, and informing a control station accordingly, or by any other conventional system.

According to a preferred embodiment each of the cars is provided with a slot into which the subscriber has to introduce his magnetic or electronic card, there being provided means to establish immediately whether the person inserting the card is entitled at that given period of time to rent a car, If so, the door of the car will be unlocked, and preferably the subscriber will be required to enter a special personal code on a keyboard, terminating his identification, Central control or the vehicle computer will authorise the use of the car, and enable the customer to start his journey, keeping track of the movement of the car via the car-location identification system, The subscriber will be able to use the car for any desired period of time, from a single journey inside a town and up to a number of days. The subscriber is entitled to terminate the car hire at any authorized parking place and need not return the car to a fixed address, thus improving the convenience of the user, As long as the car is on hire, this will be indicated to the outside by certain means, and when the user terminates his rental period, he has to actuate certain indication means, enabling the central control to bill him, and to change the indication of the car to being free for hire. If such self-rent cars will constitute a certain percentage of the cars in the streets of a given city, say about 10 per cent, this will greatly reduce parking problems as the same car can be used within a given period of time by many persons, Such a fleet of self-rent cars will also greatly reduce the use of private cars in cities, as it obviates the cost and inconvenience of parking.

Each car will be equipped with a plurality of sensors adapted to inform the vehicle computer or central control about the main systems of the car, such as fuel level, oil, cooling water, tire pressure, electrical system, state of the battery, brakes and other systems, Evaluation of the data by the computer of central control will indicate whether any servicing is required and whether it is safe to continue using the car or not, It will indicate whether servicing is required before renting the car to the next subscriber, The type and number of monitored parameters is a matter of choice of the operators of the system, The car computer and/or the central control will also control access to the luggage compartment, provide for opening and locking of the flood, opening and locking of car doors etc.

Central control has all the time a good overall picture about the distribution of cars free for hire over the network of the streets. If any undue accumulation occurs, cars can be moved by personnel to other parts of the city thus increasing the number of cars offered at such location, and to increase overall use of the car fleet.

According to a preferred embodiment, local authorities anxious to reduce the use of private cars and their parking in city streets, will allocate special parking places for cars of the system.

As pointed out above, each car will be equipped with a special computer and amongst its tasks: customer identification and authorization of car use, monitoring of car position at any given period of time (in cooperation with the car location system in city streets), monitoring status and performance of key car subsystems, and transmitting all such data to the main control station for evaluation and if required - action, Any type of commonly used cards can be used, such as magnetic cards, bar code cards, clever electronic cards, etc; the car being equipped accordingly with card-reading and decoding means. A transceiver is used for communication with central control. If desired, means can be provided for displaying any desired information for the person who rented the car. The car can also be provided with a computer graphic display.

Central control (or the memory device of the computer in any of the cars) will contain data on subscribers, also indicating disqualified ones.

The cars can be equipped with alarm means which will be actuated when an unauthorized person tries to use a car or when the car is stolen, The location indication system can be used for locating the position of a stolen car. If desired, means can be provided enabling the person renting the car to inform central control about any emergency and thus to obtain speedy assistance, Central control at offices of the company or other location, will comprise either a large computer or a network of inter-connected smaller ones, connected via a modem and transceiver with each car of the network, assigning to each car or group of cars a special frequency, As transmissions are only for a small percentage of time, computers and transceivers can be used for communication with a plurality of cars.

Nearly all of the components used in the system are conventional ones and need no detailed description, As stated above, the main feature is the semi-automatic car hire processes and return of vehicle after use by parking in any authorized parking zone. Pick-up of any free car will be wherever such a car is found parked, i.e, where the last user has terminated his car-hire,

BRIEF DESCRIPTION OF THE DRAWINGS

The invention is illustrated with reference to the enclosed schematical drawings, which are not according to scale and in which.

DETAILED DESCRIPTION OF THE EMBODIMENT

Various systems and subsystems of the present invention are illustrated with reference to the enclosed drawings, and it ought to be understood that these are of an illustrative nature only, and that many variations and changes in the components, functions and interconnections can be resorted to, without departing from the general scope of the semi-automatic car-hire system of the invention.

Figure 1:
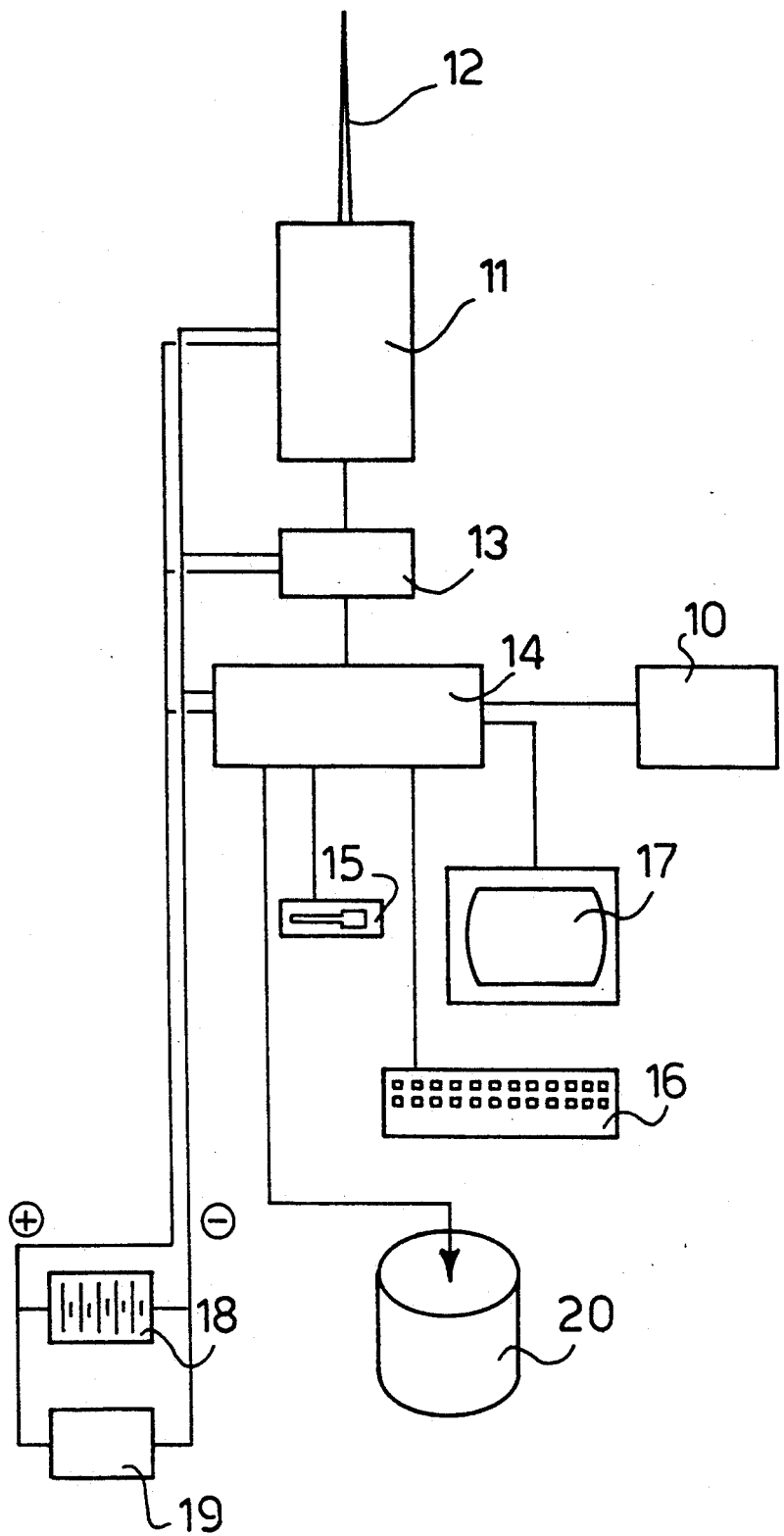
FIG. 1 is a block diagram of the mobile car position indicating system, part of the car for hire.

As shown in FIG. 1 it car position indicating means according to the invention comprise in combination a transceiver 11, provided with an antenna 12, connected via modem 13 to a computer, generally a digital computer 14 which is connected with floppy disk drive 15, with keyboard 16 for providing input to the computer 14, and with monitor 17 connected to the computer. The device is powered by car battery 18 or by power supply 19. The computer 14 is also connected with a memory device such as a hard disk drive 20, The keyboard can be used for the input of information by the person renting the car with both vehicle control and central control, it can be used by both vehicle and central control for information the person hiring the car of any problems, such as any technical problems with a car sub-system, etc, The mionitor can be used also for providing instantaneous information on the real-time position of the car moving in traffic. It is clear that this device has a versatility of uses and can be used both by vehicle control and central control and by the person hiring the car for mutual information, and also to control key subsystems of the car by either central control or vehicle control.

Figure 2:
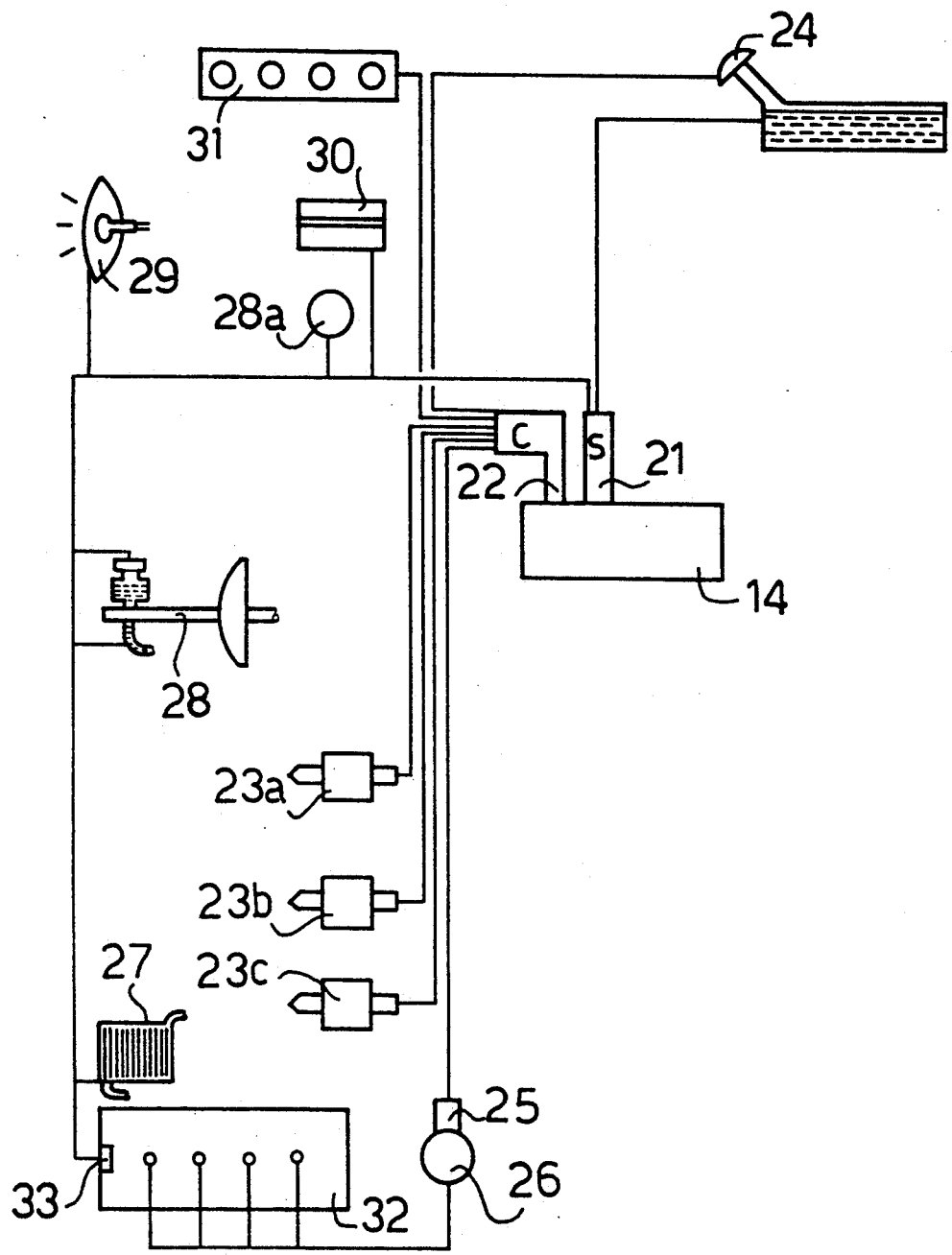
FIG. 2 is a block diagram of a car status monitoring and control system incorporated in cars of the invention.

FIG. 2 illustrates a control system of the car provided with means for indicating to central control the status of many of the critical components of the car, and it also allows both controls to exert control over subsystems, such as car lock, fuel inlet etc. This system comprises in combination sensor interface 21 to the car computer 14, and interface channel 22 for activating electrical means such as control elements comprising an electrical car-lock 23, a similar lock for the fuel inlet 24, a hood lock 24', and a relay 25 connected with distributor 26; allowing control to monitor the function of the distributor 26 and also to connect and disconnect it at will, There are provided temperature and volume sensing means for radiator 27 and sensor for the fuel in the fuel tank and a sensor for the hydraulic fluid system 28, and one for monitoring the car lamp status, 29. The computer 14 is further connected with personal card reader 30 and with car-status indicator 31, which provides a person outside the car with information whether the car is available for hire, or not, and whether it requires servicing, Car engine 32 is provided with temperature measuring means 33.

As shown, the sensors and control elements are connected with the computer, which can communicate via the system of FIG. 1 with central control and also receive and carry out commands received from central control. Ranges of acceptable values of the various parameters can be stored in the memory of the computer 14, enabling the computer to monitor whether the subsystems are in operating condition.

Figure 3:
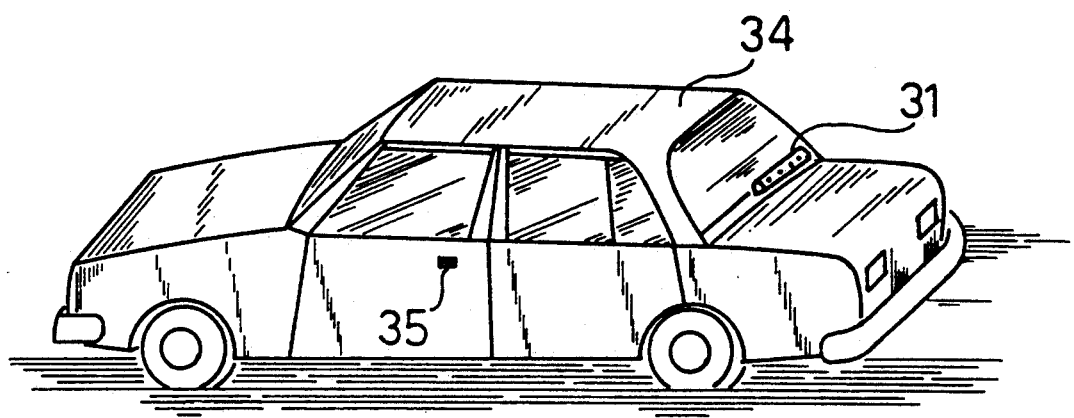
FIG. 3 is a perspective view of a car equipped with a slot for inserting the actuation (magnetic) card of the user; and which bears also indication means for the status of the car at any given period of time.
Figure 4:
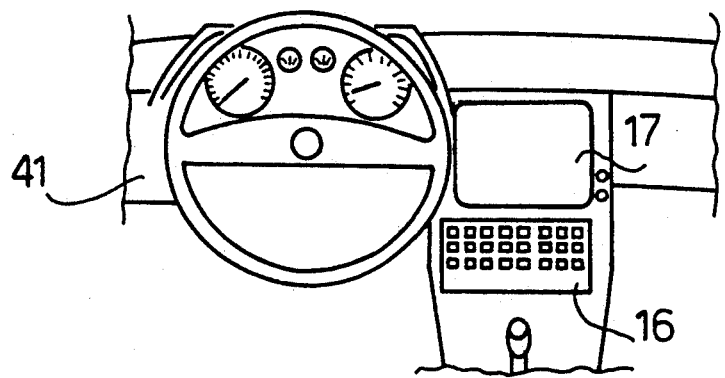
FIG. 4 illustrates the dashboard of such a car, computer keyboard and monitor screen.

As shown in FIG. 3, the car 34 is provided with the card entrance slot 35 of card reader 30, and with the status indicator 31, As shown in FIG. 4, the conventional dashboard of the car 41, provides the conventional car control means and the regular indicators of speed, fuel gauge etc, Adjacent these there is provided the monitor 17 and the keyboard 16 which have been described with reference to FIG. 1.

Figure 5:
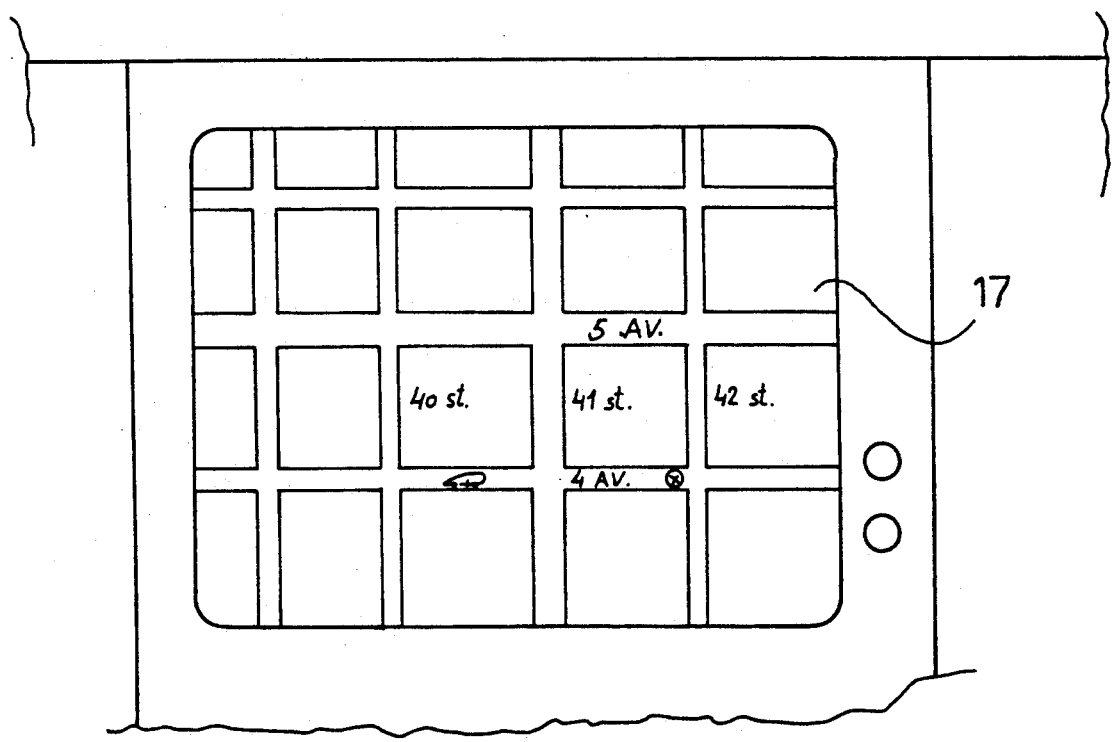
FIG. 5 is a plan view of part of a city indicating plan, as displayed on the screen of the monitor in the car, indicating car position.

The instantaneous car position can be displayed, as shown in FIG. 5, on monitor 17, thus enabling the user of the car to find his way through traffic to any desired destination. Such destination is provided at the beginning of the journey to the car computer, and this retrieves the required output from the memory disk and if required obtains and displays further information obtained from central control.

Central control maintains during all the time of the rental period full control of the car, and is able to terminate if required the operation of the car, Furthermore, control is continuously appraised of the status of critical subsystems and their functioning, thus making possible the provision of information to the car hirer and also to correct by means of service personnel any faults which require servicing and repair.

The car can also be equipped with means for indicating to central control theft of the car, Means can also be provided for indicating to control any sudden shock, such as will occur in a traffic accident or even be caused by a third party to the parking car.

Other and further parameters can be sensed and controlled, and the choice of these is largely a matter of choice of the operator of the entire car rent system and this may also differ between different types of cars according to specific characteristics of these.

Figure 6:
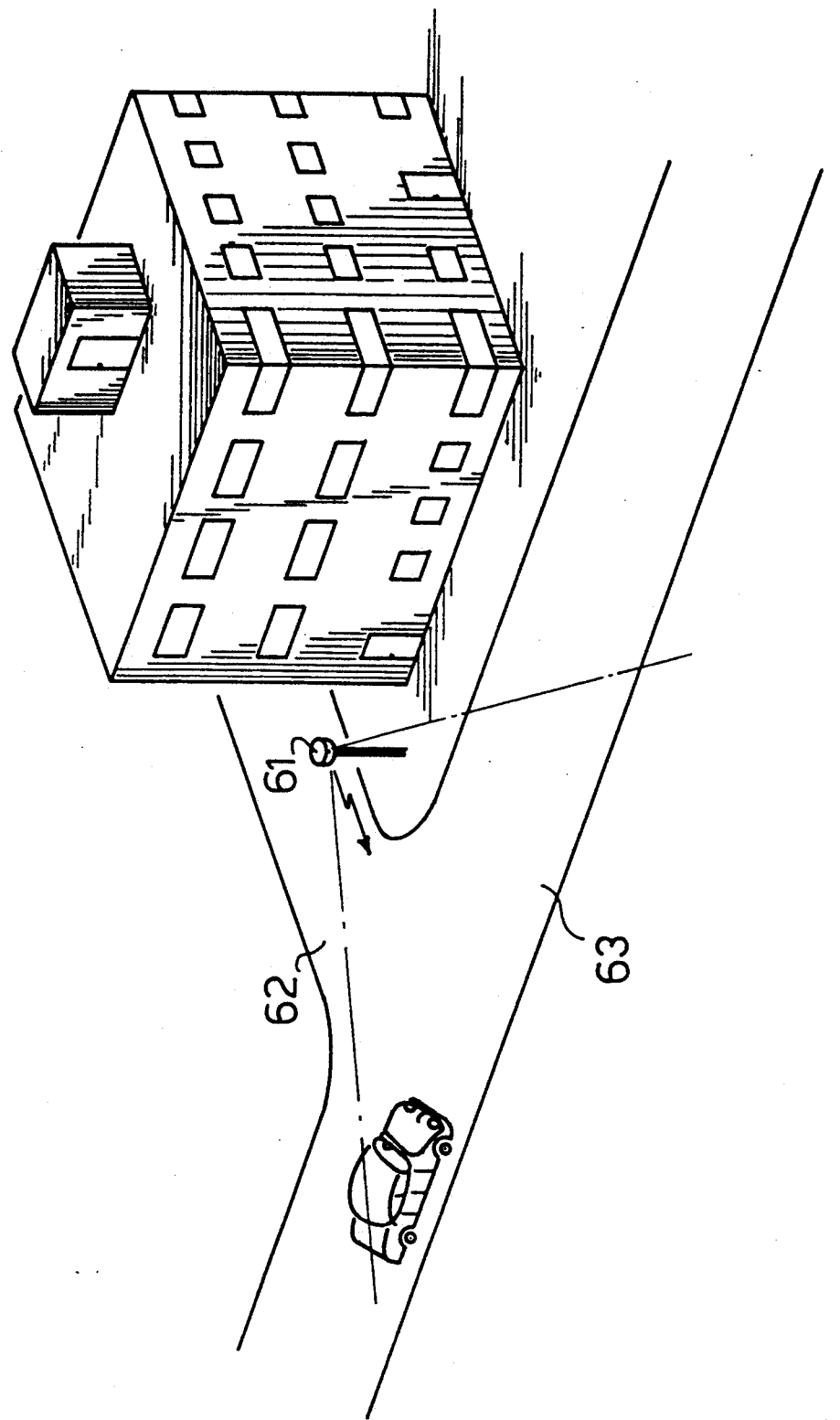
FIG. 6 is a perspective view of a car location determining system).

According to a preferred embodiment, the car rental system comprises means for determining in real time the exact location of each rented car while this travels through the streets of a town, Such a system is illustrated with reference to FIG. 6 which is a schematical perspective view of a car moving in a street, where at one of the corners a transceiver station is located.

The principle of this system is the provision of a plurality transceiver stations, 61, located along suitable positions along city roads, as here, at the intersection of certain roads 62 and 63. This transceiver 61' is connected by phone or other means to central control, and communicates with control using a code which is specific for each such transceiver.

Each of tile rental cars 64 is equipped with a transceiver, digital computer and memory means, The transmission range of 61 is small, and when car 64 passes close to transceiver 61, the mobile transceiver receives a signal, and the code and storage of location data enables the computer of the car to inform the user about his position with a high degree of accuracy, At the same time the transceiver 61 informs central control about the fact that a certain defined car has passed the transceiver, and on its direction of travel, thus enabling control to ascertain in real time the exact position of each travelling car.

I claim:

1. A semi-automatic car-rental system comprising a fleet of cars, which are clearly marked as belonging to such system, enabling a customer to pick up and rent a car located at a random parking location, which said car is free for rent, which rental system comprises in combination:

a fleet of cars, each of which is provided with identity and entitlement checking means, for cooperating with customer identification means held by said customer, said identity and entitlement checking means for identifying the customer to a car computer located in said car to be rented or via said computer and communication means to a computer located at a central control station, said identity and entitlement checking means enabling an entitled customer to enter said car and actuate said car and use said car; location identification means, informing said central control station and said car computer about the instant location of said car; a central control station which stores and continuously updates data about the instant location of each car of said car fleet having means for receiving and evaluating data for entitlement verification and for transmitting to said car a command authorizing or not authorizing the intended rental, and for monitoring data of each rental until the customer terminates the rental by parking said car at any random parking place and indicating a termination of the rental, or reservation of said car for future use.

2. A system according to claim 1, where the location identification means comprise a plurality of car position indicating transceivers positioned in an area of operation of the car rental system, transmitting to said central control station data about a movement of each car of said car fleet.

3. A system according to claim 1, where the location identification means is located in said car and serves to inform said car computer about a car location.

4. A system according to claim 1, where each car is equipped with means for indicating to said central control station data on the state of vital subsystems of such car, including fuel reserve, oil level and pressure and cooling fluid level and temperature, braking fluid level and pressure, electricity consumption of main electrical consumers.

5. A system according to claim 1, where means are provided at the central control station for billing a customer for each rental.

6. A car rental system according to claim 1 where the customer indentification means comprises a magnetically, electronically or optically encoded card, and where each car of the system is equipped with a subsystem for interacting with such card, and for enabling customer identification.

7. A car rental system according to claim 1 where the cars of the system are equipped with door locks which are remote-controlled, enabling the central control station to lock and unlock any car.

8. A car rental system according to claim 1, where means are provided enabling the central control station to connect or disconnect by remote control the ignition system of each car of the rental system.

9. A car rental system according to claim 1, where each car of the system is equipped with means enabling the central control station to provide the customer with any required information.

10. A car rental system according to claim 1, where each car of the system is equipped with means to measure and store data concerning magnitude and time of any physical shocks to the car.

* * * * *

UNITED STATES PATENT AND TRADEMARK OFFICE
CERTIFICATE OF CORRECTION

PATENT NO.: 5,289,369
DATED : February 22, 1994
INVENTOR(S): HIRSHBERG

It is certified that error appears in the above-identified patent and that said Letters Patent is hereby corrected as shown below:

Title Page:
In line [57] - ABSTRACT, lines 8 and 14, kindly change "tile" to --the--.

Signed and Sealed this

Eleventh Day of October, 1994

Attest:

BRUCE LEHMAN

Attesting Officer          Commissioner of Patents and Trademarks